(12) United States Patent
Bedekar et al.

(10) Patent No.: US 12,213,005 B2
(45) Date of Patent: Jan. 28, 2025

(54) RADIO ACCESS NETWORK CONTROLLER METHODS AND SYSTEMS TO OPTIMIZE INTER FREQUENCY LOAD BALANCING

(71) Applicant: Nokia Technologies Oy, Espoo (FI)

(72) Inventors: Anand Bedekar, Glenview, IL (US); Shivanand Kadadi, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 341 days.

(21) Appl. No.: 16/978,904

(22) PCT Filed: Feb. 15, 2019

(86) PCT No.: PCT/EP2019/053782
§ 371 (c)(1),
(2) Date: Sep. 8, 2020

(87) PCT Pub. No.: WO2019/170391
PCT Pub. Date: Sep. 12, 2019

(65) Prior Publication Data
US 2021/0051519 A1 Feb. 18, 2021

(30) Foreign Application Priority Data
Mar. 8, 2018 (IN) .............................. 201841008631

(51) Int. Cl.
*H04W 28/08* (2023.01)
*H04W 28/082* (2023.01)
(Continued)

(52) U.S. Cl.
CPC ....... *H04W 28/082* (2023.05); *H04W 28/086* (2023.05); *H04W 36/22* (2013.01)

(58) Field of Classification Search
None
See application file for complete search history.

(56) References Cited

U.S. PATENT DOCUMENTS 9,843,963 B2 12/2017 Xiao et al.
2012/0039175 A1 2/2012 Sridhar et al.
(Continued)

FOREIGN PATENT DOCUMENTS

CN 101415234 A 4/2009
CN 102577513 A 7/2012
(Continued)

OTHER PUBLICATIONS

"Proposal on RRM Server in E-UTRAN Architecture", 3GPP TSG-RAN3#51, R3-060142, Agenda : 12.13.5, NTT DoCoMo, Feb. 13-17, 2006, pp. 1-3.
(Continued)

*Primary Examiner* — Kodzovi Acolatse
(74) *Attorney, Agent, or Firm* — SQUIRE PATTON BOGGS (US) LLP

(57) ABSTRACT

Various communication systems may benefit from adaptive handling of communication loads. For example, certain wireless communication systems may benefit from a method and application programming interface between a radio access network and a controller to optimize inter-frequency load balancing (IFLB). A method can include receiving policy inputs regarding how the IFLB should be operated. The method can also include negotiating a functional split of IFLB-related functions for the purposes of executing inter-frequency load-balancing. The method can further include receiving a set of data/attributes related to facilitate determination of optimal settings for IFLB.

17 Claims, 16 Drawing Sheets

(51) Int. Cl.
*H04W 28/086* (2023.01)
*H04W 36/22* (2009.01)

(56) References Cited

U.S. PATENT DOCUMENTS

| | | | |
|---|---|---|---|
| 2012/0329500 A1 | 12/2012 | Budic | |
| 2013/0170362 A1* | 7/2013 | Futaki | H04W 24/02 370/241.1 |
| 2015/0087325 A1* | 3/2015 | Nuss | H04W 28/0247 455/453 |
| 2015/0249989 A1 | 9/2015 | Aksu et al. | |
| 2017/0332303 A1* | 11/2017 | Sunay | H04W 36/0072 |
| 2018/0323886 A1* | 11/2018 | Yi | H04L 5/0048 |
| 2018/0367273 A1* | 12/2018 | Park | H04L 41/06 |
| 2018/0368037 A1* | 12/2018 | Wang | H04W 36/00837 |
| 2020/0178326 A1* | 6/2020 | Sirotkin | H04W 76/12 |
| 2021/0084557 A1* | 3/2021 | Song | H04W 36/0085 |
| 2021/0142257 A1* | 5/2021 | Stephens | G06Q 10/06393 |

FOREIGN PATENT DOCUMENTS

| | | | |
|---|---|---|---|
| CN | 107079345 A | | 8/2017 |
| JP | 2013-540380 A | | 10/2013 |
| WO | 2017/195080 A1 | | 11/2017 |

OTHER PUBLICATIONS

"Fronthaul Working Group", xRAN Forum, White Paper, Oct. 2017, pp. 1-7.
"The Mobile Access Network, Beyond Connectivity", xRAN.org White Paper, Oct. 2016, pp. 1-10.
International Search Report and Written Opinion received for corresponding Patent Cooperation Treaty Application No. PCT/EP2019/053782, dated May 9, 2019, 11 pages.
"Mobility Load Balancing Optimization Solution", 3GPP TSG RAN WG3 Meeting #59, R3-080361, Agenda : 10.1.1b, Huawei, Feb. 11-15, 2008, pp. 1-4.
Office action received for corresponding Japanese Patent Application No. 2020-546897, dated Nov. 30, 2021, 5 pages of office action and 3 pages of translation available.
First Office Action dated Oct. 13, 2023 corresponding to Chinese Patent Application No. 201980028832.5, with English summary thereof.
Notification of Ground of Rejection dated Oct. 13, 2022 corresponding to Japanese Patent Application No. 2020-546897, with English translation thereof.
Communication pursuant to Article 94(3) EPC dated Jun. 24, 2022 corresponding to European patent Application No. 19706479.3.
Communication under Rule 71(3) EPC dated Nov. 23, 2023 corresponding to European Patent Application No. 19706479.3.

* cited by examiner

RADIO ACCESS NETWORK CONTROLLER METHODS AND SYSTEMS TO OPTIMIZE INTER FREQUENCY LOAD BALANCING

RELATED APPLICATION

This application was originally filed as PCT Application No. PCT/EP2019/053782, filed on Feb. 15, 2019, which claims priority from IN Patent Application No. 201841008631, filed on Mar. 8, 2018, each of which is incorporated herein by reference in its entirety.

BACKGROUND

Field

Various communication systems may benefit from adaptive handling of communication loads. For example, certain wireless communication systems may benefit from a method and application programming interface between a radio access network and a controller to optimize inter-frequency load balancing.

Description of the Related Art

Inter-frequency load-balancing (IFLB) is a function that is typically performed by a radio access network (RAN) node, such as an evolved Node B (eNB) in long term evolution (LTE) or next generation Node B (gNB) in fifth generation (5G). The function is typically performed for the purposes of balancing load across various carriers supported at that RAN node. For example, if one carrier gets loaded, according to a suitable definition of load, users may be handed off from one carrier to another so as to achieve a better balance of load across the carriers. The IFLB algorithm in the RAN node decides when to initiate load-balancing in a particular cell, determination of which users to hand over, selection of target cells to hand off users, obtaining the appropriate channel measurements, and executing handover (HO).

The RAN node is typically configured with a set of static parameters related to the IFLB algorithm, typically by the element management system (EMS). Typically this is done once at initialization. For example, there may be parameters that set a "high load threshold" beyond which IFLB is triggered, and a "target load threshold" beyond which a cell should not accept further load. Alternatively, there may be parameters that determine the type of measurements that should be obtained from candidate users, various thresholds and filter coefficients related to the measurements, and for execution of handovers to selected cells.

IFLB configuration parameters are typically set statically as template values for all cells. This can lead to mismatches between the IFLB settings and the actual conditions in the cells. For example, any individual cell may be very different from other cells, in terms of load the cell experiences, load on the cell's neighbors, the number of users of the cell, the mix of traffic (e.g. guaranteed bit rate (GBR) vs non-GBR), distribution of signal to interference plus noise ratio (SINR) within the cell, fraction of indoor vs outdoor (or cell-edge vs cell center), the propagation of different carriers in different bands, and the like. These cell experiences may vary a lot from cell to cell, and may also vary over time within the same cell.

A configured high load threshold value may not be large enough to aggressively offload user equipment (UEs) to neighbor cell quickly to avoid cell overload. In other cases, a configured target load threshold may not be high enough to accept more UEs from neighbor cells even though the cell has the capacity. Incorrect values of various radio frequency (RF)-measurement-related parameters (for example, reference signal received power (RSRP) and reference signal received quality (RSRQ) filter thresholds) may cause HO failures or reduce the amount of UE offload. There may be differences in the signal-to-interference-noise ratio (SINR) experienced by the UEs on the different carriers, due to which certain cells or carriers may be preferable to other carriers for delivering traffic, but these may be incorrectly prioritized in the load balancing algorithm. Moreover, a network operator may wish to maximize a particular target objective or value function, but the IFLB operation at the RAN may not correctly maximize an operator's desired objective.

Further, the RAN is typically constrained in terms of how much data it can store or analyze. Typically a RAN node such as an eNB or gNB can only maintain short-term counters or the like. Thus, a RAN node is typically incapable of doing long-time-scale statistical analysis or machine learning.

SUMMARY

In accordance with some embodiments, a method may include receiving, by a controller, a set of data related to a determination of optimal settings for inter-frequency load-balancing. The method may further include determining, by a controller, at least one modification to at least one parameter of inter-frequency load-balancing operation to be performed by a radio access network node. The method may further include communicating, by a by the controller, the determined at least one modification.

In accordance with some embodiments, a method may include providing, by a radio access network node, a set of data related to a determination of optimal settings for inter-frequency load-balancing. The method may further include receiving, by the radio access network node, at least one modification to at least one parameter of inter-frequency load-balancing.

In accordance with some embodiments, an apparatus may include means for receiving a set of data related to a determination of optimal settings for inter-frequency load-balancing. The apparatus may further include means for determining at least one modification to at least one parameter of inter-frequency load-balancing operation to be performed by a radio access network node. The apparatus may further include means for selecting at least one candidate target cell for handover of at least one user equipment for load-balancing purposes.

In accordance with some embodiments, an apparatus may include means for providing a set of data related to a determination of optimal settings for inter-frequency load-balancing. The apparatus may further include means for receiving at least one modification to at least one parameter of inter-frequency load-balancing.

In accordance with some embodiments, an apparatus may include at least one processor and at least one memory including computer program code. The at least one memory and the computer program code may be configured to, with the at least one processor, cause the apparatus to at least receive a set of data related to a determination of optimal settings for inter-frequency load-balancing. The at least one memory and the computer program code may be further configured to, with the at least one processor, cause the apparatus to at least determine at least one modification to at least one parameter of inter-frequency load-balancing operation to be performed by a radio access network node. The at least one memory and the computer program code may be further configured to, with the at least one processor, cause the apparatus to at least communicate the determined at least one modification.

In accordance with some embodiments, an apparatus may include at least one processor and at least one memory including computer program code. The at least one memory and the computer program code may be configured to, with the at least one processor, cause the apparatus to at least provide a set of data related to a determination of optimal settings for inter-frequency load-balancing. The at least one memory and the computer program code may be further configured to, with the at least one processor, cause the apparatus to at least receive at least one modification to at least one parameter of inter-frequency load-balancing.

In accordance with some embodiments, a non-transitory computer readable medium may be encoded with instructions that may, when executed in hardware, perform a method. The method may receive a set of data related to a determination of optimal settings for inter-frequency load-balancing. The method may further determine at least one modification to at least one parameter of inter-frequency load-balancing operation to be performed by a radio access network node. The method may further communicate the determined at least one modification.

In accordance with some embodiments, a non-transitory computer readable medium may be encoded with instructions that may, when executed in hardware, perform a method. The method may provide a set of data related to a determination of optimal settings for inter-frequency load-balancing. The method may further receive at least one modification to at least one parameter of inter-frequency load-balancing.

In accordance with some embodiments, an apparatus may include circuitry configured to receive a set of data related to a determination of optimal settings for inter-frequency load-balancing. The circuitry may further determine at least one modification to at least one parameter of inter-frequency load-balancing operation to be performed by a radio access network node. The circuitry may further communicate the determined at least one modification.

In accordance with some embodiments, an apparatus may include circuitry configured to provide a set of data related to a determination of optimal settings for inter-frequency load-balancing. The circuitry may further receive at least one modification to at least one parameter of inter-frequency load-balancing.

BRIEF DESCRIPTION OF THE DRAWINGS

For proper understanding of the invention, reference should be made to the accompanying drawings, wherein.

DETAILED DESCRIPTION

To address the issues with inter-frequency load balancing described above, an embodiment of the invention devises a controller that can interface to a wireless radio access network (RAN) by means of suitably defined interfaces such as application programming interfaces (APIs), the controller being capable of optimizing the performance of inter-frequency load-balancing, for example by using machine learning, while letting the RAN perform IFLB operations autonomously. The interface between the controller and a RAN node is targeted for enabling optimization of IFLB. Specific features and/or functionality are incorporated into such Controllers and APIs for the purpose of optimizing inter-frequency load balancing. In an embodiment, the interface between the RAN and the controller allows the RAN to provide to the Controller data/attributes relevant to the inter-frequency load-balancing process, using which the Controller may decide optimal adjustments or recommendations regarding inter-frequency load-balancing operations to be performed by the RAN. The interface allows the Controller to communicate these adjustments or recommendations to the RAN.

Figure 1:
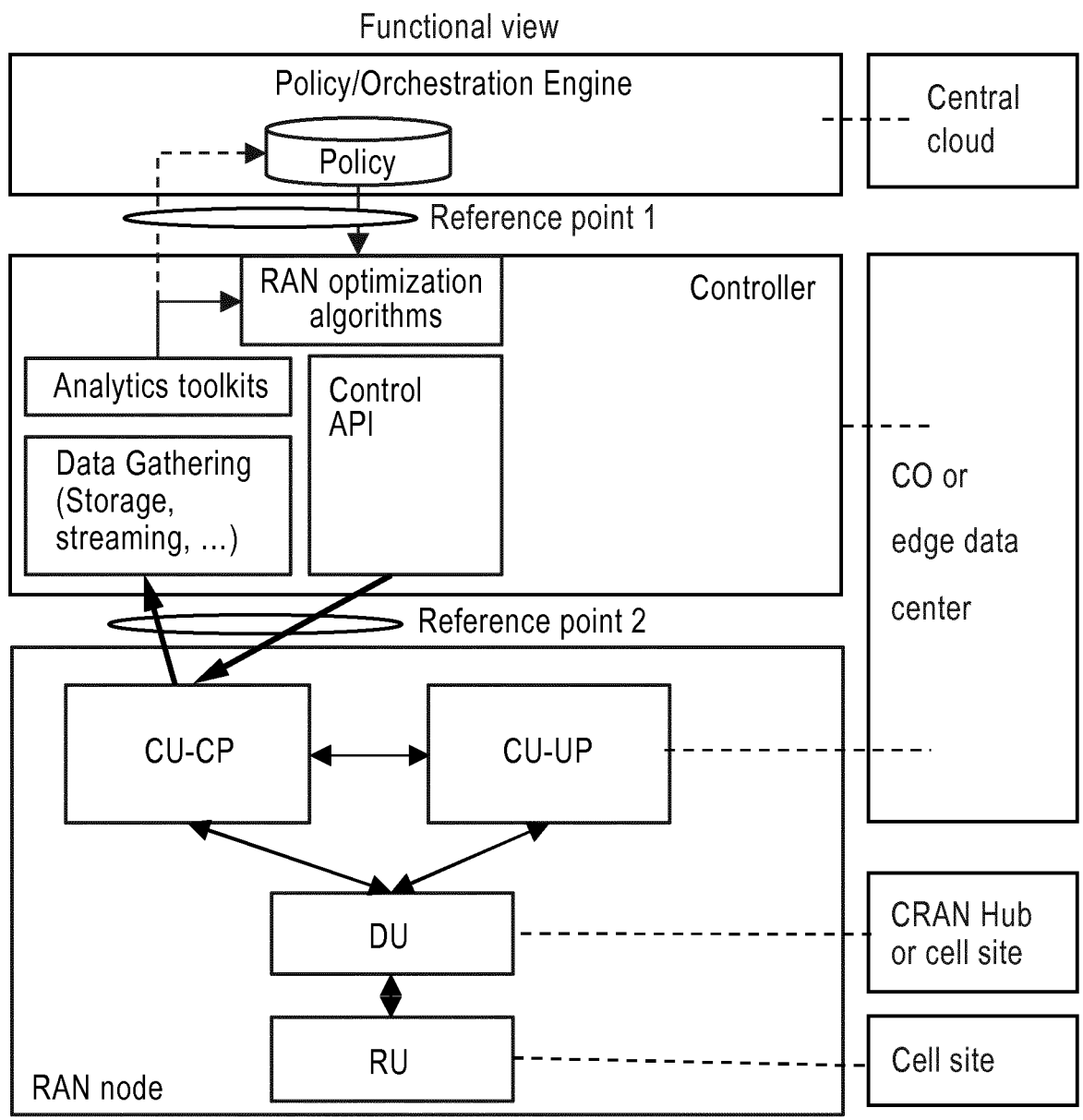
FIG. 1 illustrates an architecture view and role of a controller, according to certain embodiments.

FIG. 1 illustrates an architecture view of a network, according to certain embodiments. As shown in FIG. 1, there can be policy node, such as a policy/orchestration engine, in a central cloud. This engine can be in communication with a controller over a reference point 1, which may be labeled as interface A1. The controller can include RAN optimization algorithms, including algorithms to optimize inter-frequency load-balancing, for example to decide optimal adjustments or recommendations. The controller can also include analytics toolkits and data gathering mechanisms to facilitate the optimization algorithms, and a control API or interface towards the RAN for communicating optimal adjustments or recommendations to the RAN. The controller can communicate with the policy/orchestration engine over a Reference Point 1 and can also inform the RAN optimization algorithms. The RAN optimization algorithms can receive additional information from the policy/orchestration engine over reference point 1. The controller can be at a central office (CO) or an edge data center.

The controller can be connected with a RAN node (which may be a gNB or eNB or other suitable wireless access point) over a reference point 2, which may be labeled interface B1. The RAN node or gNB can include central unit (CU) control plane (CP) (CU-CP) and CU user plane (UP) (CU-UP) functions that may be at a CO or edge data center.

The gNB can also include a distributed unit (DU) which may be typically at a CRAN Hub or cell site. The gNB can further include a remote unit (RU) at a cell site.

A policy node, such as a policy/orchestration engine, for example an open network automation platform (ONAP) or a network management system (NMS) or an operations support system (OSS), can provide policy directives to the optimization in the controller. The policy directives may enable an operator to set various types of targets that the inter-frequency load-balancing optimization should aim to achieve, such as target objective function, or an appropriate measure of load-balancing. The controller may have an interface towards the policy/orchestration engine for the purposes of obtaining such policy directives.

Figure 2:
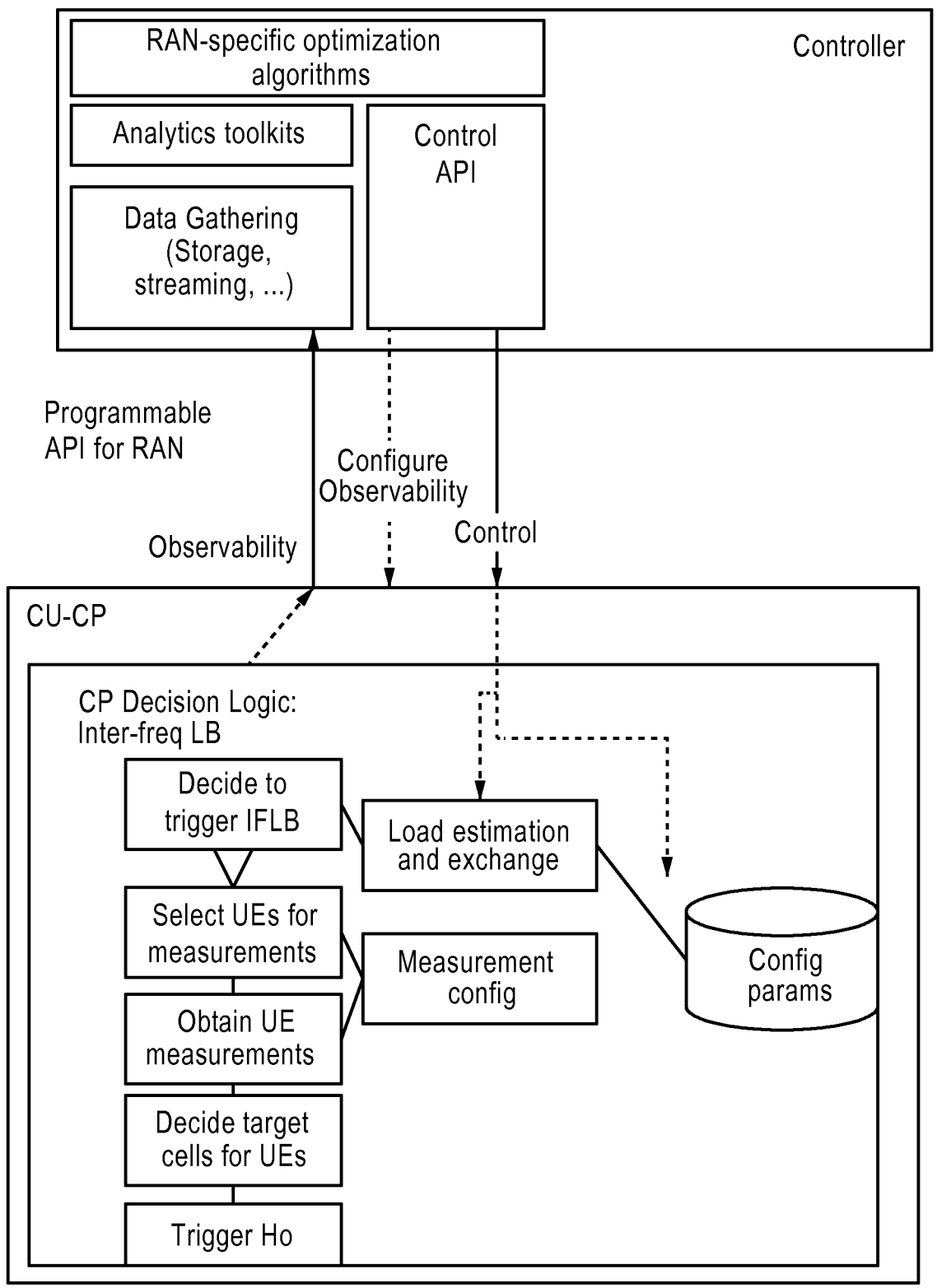
FIG. 2 illustrates characteristics of a programmable API for RAN, according to certain embodiments.

FIG. 2 illustrates characteristics of a programmable API for RAN, according to certain embodiments. As shown in FIG. 2, one possible way to improve the situation is to enable an API from the RAN towards a controller, which can be based in an edge cloud, to enable RAN to expose relevant data to the controller, enable the controller to do statistical analysis or machine learning to learn the relevant characteristics of each cell, and tell the RAN to make optimal adjustments to the IFLB configuration parameters so as to address the above issues.

In such cases, the controller can, for example, optimally adjust the IFLB algorithm settings as the conditions in the cell or characteristics of users change. Accordingly, certain embodiments may provide a set of APIs and a method for a controller to be able to determine optimal IFLB settings or adjustments to IFLB settings and communicate those to the RAN.

Thus, as shown in FIG. 2, certain embodiments can provide observability of the controller data to the RAN. Moreover, certain embodiments can permit the controller to configure the observability and even to directly control the RAN as to certain aspects. Within the RAN, typically within a CU-CP module, there can be decision logic for inter-frequency (inter-freq) load balancing (LB) operations.

For example, as shown in FIG. 2, the module can receive or calculate load estimation or load metric information. The module can decide to trigger or initiate IFLB. The module can also select specific UEs for obtaining measurements and decide on or reference appropriate measurement configuration. The module can then obtain measurements from the UEs, in some cases after providing the UEs with an appropriate measurement configuration, and decide target cells for certain specific UEs. Finally, the module can initiate and execute handover for the specific UEs to the target cells. Thus, the RAN node may embody a variety of inter-frequency load-balancing related operations. As noted above, there may be challenges with the performance of such operations in the RAN, and certain embodiments utilize the controller to address these challenges.

Figure 3:
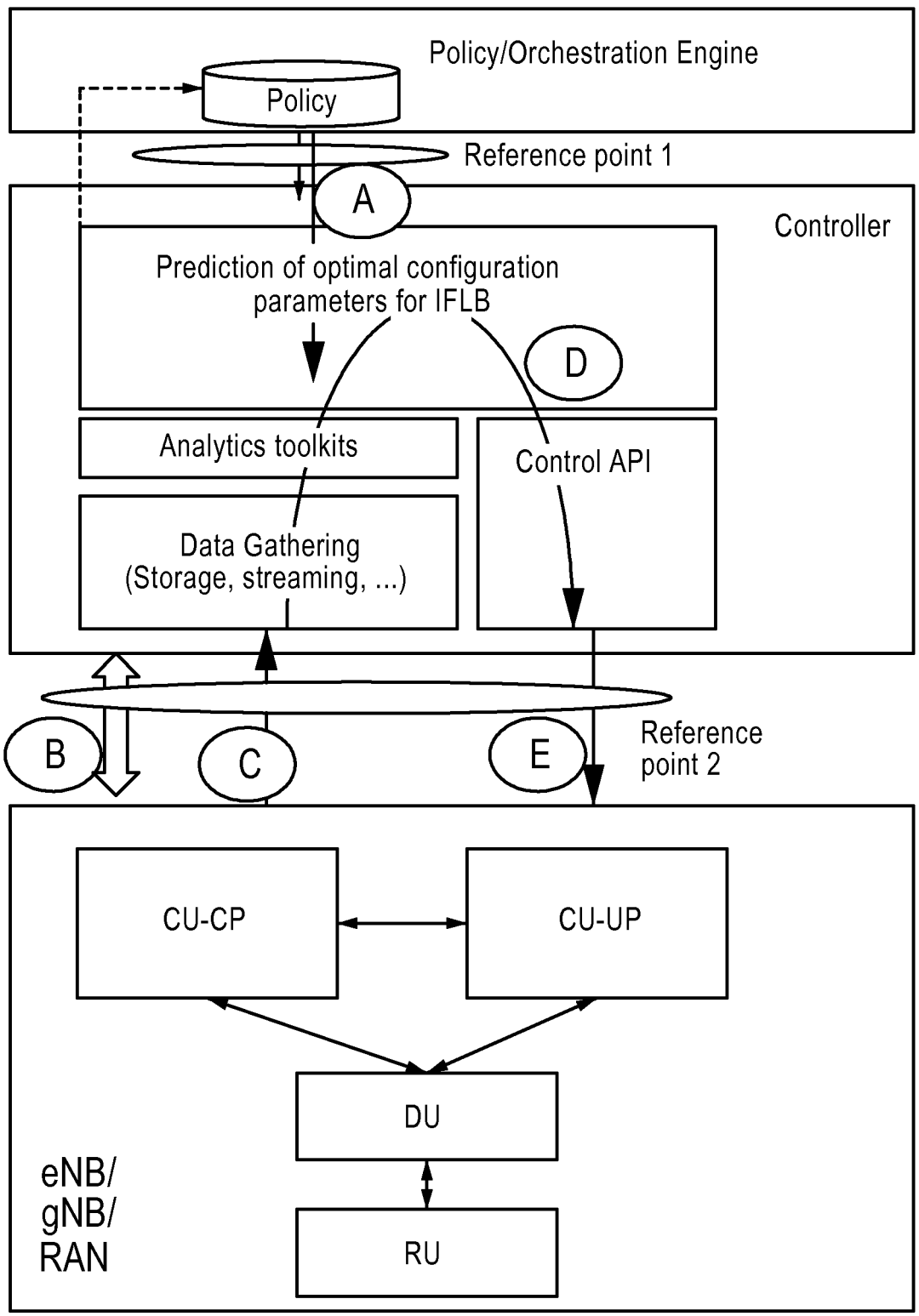
FIG. 3 illustrates various aspects of methods according to certain embodiments.

FIG. 3 illustrates various aspects of methods according to certain embodiments. Certain embodiments may include some or all of the following aspects, which are labelled for convenience and ease of reference as A-E.

For example, at A, a method can include providing, by a policy/orchestration engine to a controller, policy inputs regarding how the IFLB should be operated. These policy inputs can be provided over an interface/reference point 1, which may be labeled interface A1.

At B, the method can include negotiating a functional split of IFLB-related functions between a RAN and a controller for the purpose of executing inter-frequency load-balancing.

At C, the method can include providing, by a RAN node or by a cell in an eNB/gNB/RAN to a controller, a set of data/attributes related to facilitate determination of optimal settings or adjustments for IFLB. This can happen over a data exposure API/interface which can be a part of reference point 2, which may be labeled interface B1.

At D, the method can include the controller making a determination on adjustments or recommendations or modifications/update to various aspects or parameters/settings related to the IFLB operations to be performed by the RAN. The method can also include, at E, communicating, by the controller to the cell in eNB/gNB/RAN, the adjustments or modifications/updates related to the IFLB operations to be performed by RAN. This communication can happen over a control API/interface, which can be part of reference point 2.

Figure 4:
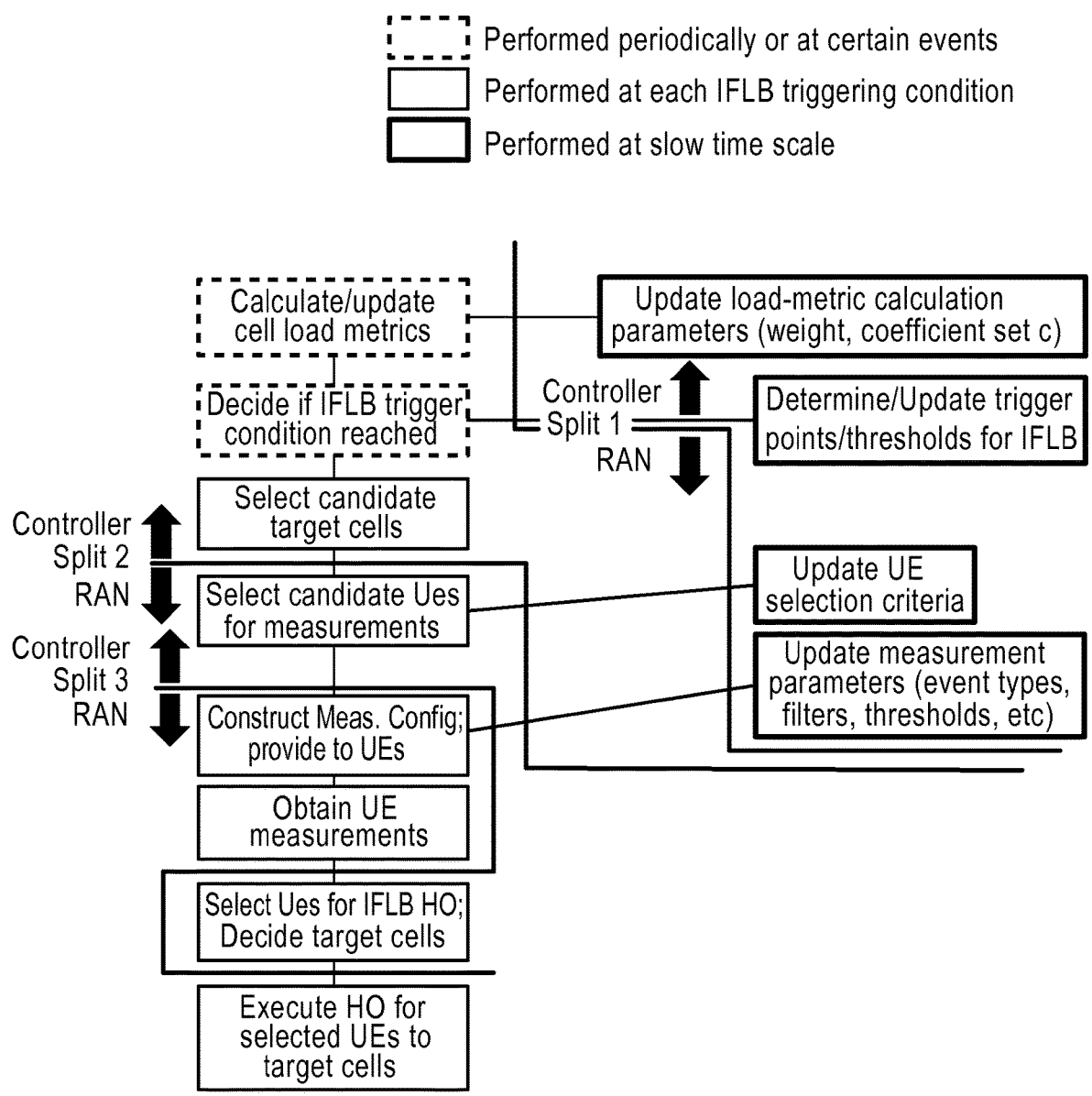
FIG. 4 illustrates several functional splits, according to certain embodiments.

FIG. 4 illustrates several functional splits, according to certain embodiments. The set of functions involved in IFLB operations may be split between the RAN and the controller in various ways in different embodiments, that is, for the purposes of IFLB operations there may be various functional splits between the Controller and the RAN. As shown in FIG. 4, the functional split between the controller and the RAN node can take multiple forms. The information exchanged between RAN and Controller in each of B, C, and E may depend on the functional split of the IFLB operation between RAN and controller, described below.

Different splits of functionality between RAN and Controller are possible, for example Split 1, Split 2, and Split 3 illustrated in FIG. 4 are three possible splits. Other splits are also possible.

The information exchanged, and message flow, between the RAN and the controller may depend on the functional split. For example, in Split 1, the controller can perform only slow-time-scale actions such as adjusting various weights and factors involved in the calculation of load metrics, or determining/updating the trigger points/conditions for initiating or exiting IFLB, or determining/updating the criteria for selection of UEs and target cells, etc. The controller may not be involved in the actual processing of IFLB operations each time an IFLB initiating or exiting condition is triggered, and those operations may be performed by the RAN.

In Split 2, the controller can perform slow-time-scale operations as well as cell-level operations, such as evaluating cell load metrics, determining if IFLB trigger condition has been reached, selecting target cells, or the like. In this split option, however, all UE-level operations may be performed by RAN.

In Split 3, the controller can be involved in significant parts of the execution of IFLB operations at each IFLB triggering event, as indicated, and there can be multiple exchanges between RAN and controller for executing the processing each time an IFLB condition is triggered.

The latency requirements on the interface between RAN and controller may also be different depending on functional split. Higher latency can be tolerated on RAN-controller interface in Split 1 than to Split 2, which in turn can tolerate higher latency than Split 3.

A controller may need to interact with RAN nodes of differing capabilities for executing portions of IFLB operations. For example, some RAN nodes may be capable of executing all the IFLB operations required of a RAN node in Split 1, whereas other RAN nodes may be only capable of executing the IFLB operations required of a RAN node in Split 2 or 3, and a given controller may need to simultaneously interact with different RAN nodes of such varying capabilities. Conversely, a RAN node may also have to interface to Controllers of differing capabilities. According to an embodiment, the exact functional split to be used may be dynamically negotiated between the RAN and the controller (Aspect B) taking into account RAN capabilities, or may be statically determined. Supporting a negotiation procedure can enable a controller to work with different types of RAN implementations with different capabilities, and vice-versa.

Figure 5:
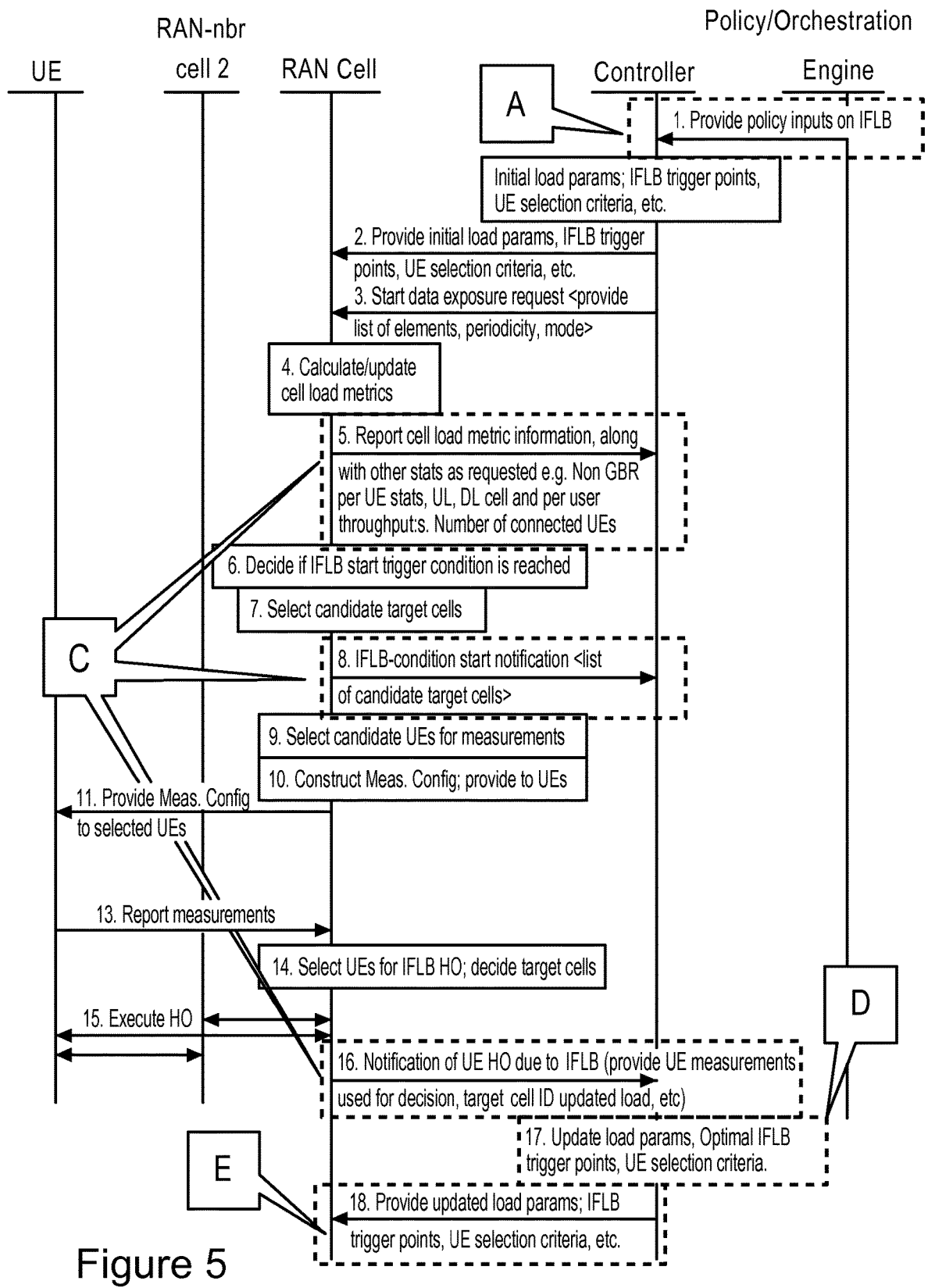
FIG. 5 illustrates a message flow for Split 1, according to certain embodiments.

FIG. 5 illustrates a message flow for Split 1, according to certain embodiments. FIG. 5 shows an example message flow. Aspects A-E mentioned above are mapped to various parts of the procedure as illustrated. These are just examples of how these aspects can be embodied in Split 1.

More particularly, in Split 1 the controller may perform only slow-time-scale actions, and may not be involved in the actual processing each time an IFLB condition is triggered. The controller can performs steps of Aspect D, for example step 17, while the RAN can perform steps 4, 6, and 7. The negotiation of the functional split is not shown, it may be assumed in the call flow that that has already been performed previously.

Figure 6:
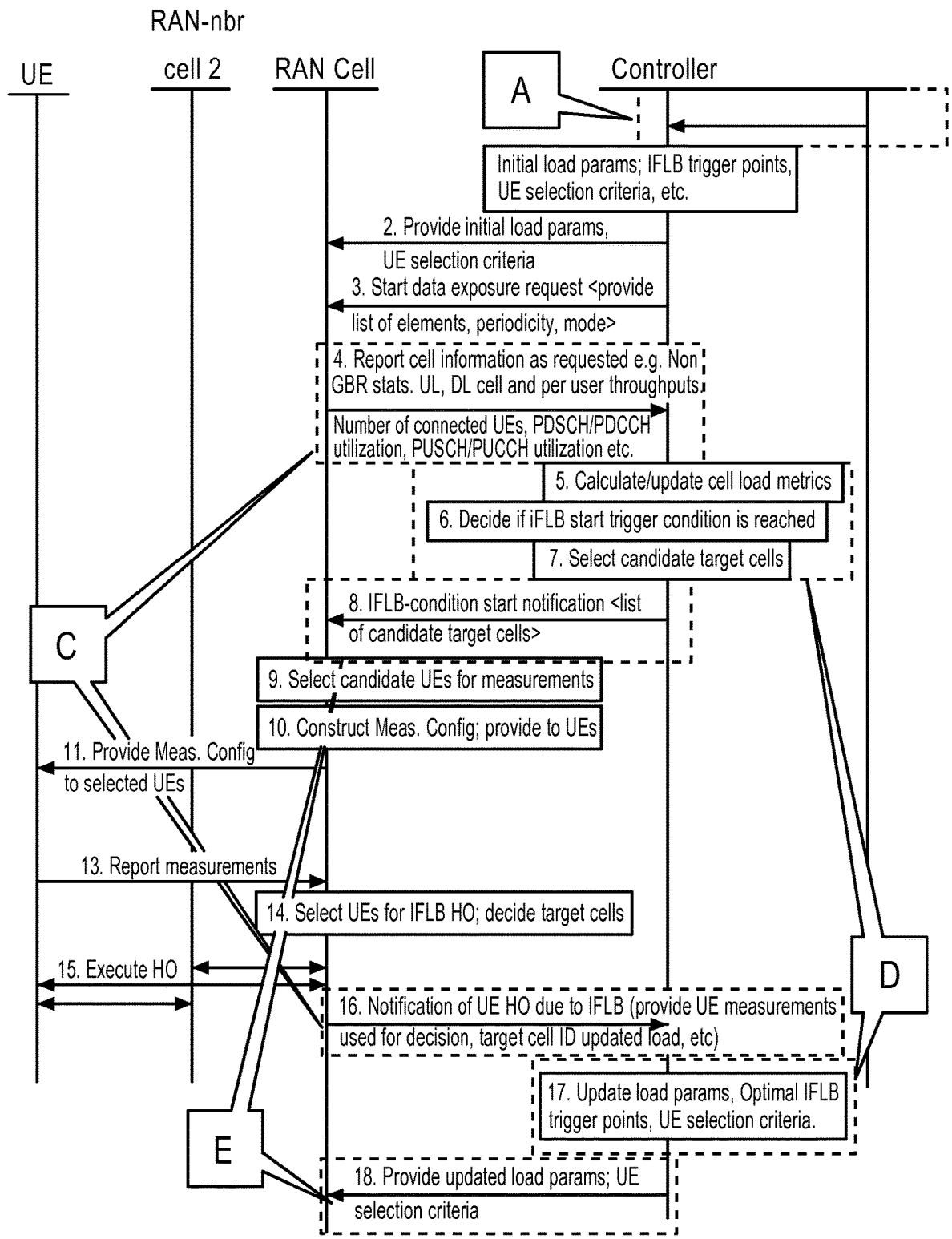
FIG. 6 illustrates a message flow for Split 2, according to certain embodiments.

FIG. 6 illustrates a message flow for Split 2, according to certain embodiments. Thus, FIG. 6 illustrates an example message flow for Split 2. In Split 2, the controller can perform slow-time-scale operations as well as cell-level operations, for example, load metric calculation, determining if IFLB trigger condition has been reached, selecting target cells, or the like. The controller can, in this case, perform Aspect D, including steps 5-7 and 17. UE-level operations can be performed by the RAN. The commands between Controller and RAN can change relative to Split 1. For example, note step 8 of Aspect E. Note that negotiation of the functional split is not shown, and it may be assumed in the call flow that the negotiation has already been previously performed.

Figure 7:
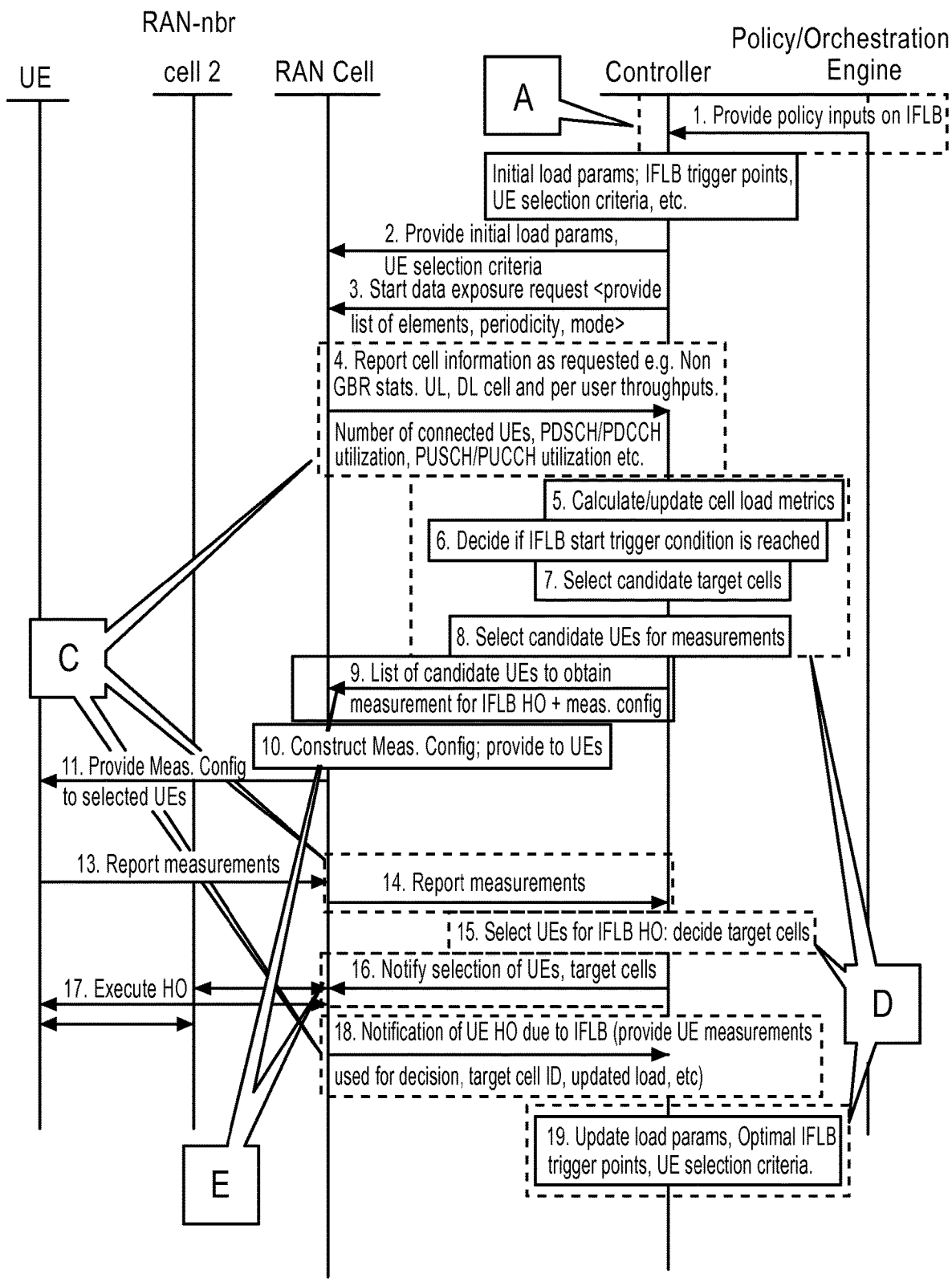
FIG. 7 illustrates a message flow for Split 3, according to certain embodiments.

FIG. 7 illustrates a message flow for Split 3, according to certain embodiments. Thus, FIG. 7 illustrates an example message flow for Split 3. In Split 3, the controller can perform slow-time-scale operations as well as cell-level operations, for example, load metric calculation, determining if IFLB trigger condition has been reached, selecting target cells, and the like, see Aspect D, for example, steps 5-7 and 17. The controller can also perform selection of UEs for handover/offload, as can be seen from Aspect D, at steps 8 and 15. The commands from Controller to RAN can change relative to Split 1. See, for example, Aspect E and note steps 9 and 16. As in the previous examples, negotiation of the functional split is not shown, but it may be assumed in the call flow that the negotiation has already been performed previously.

There may be further details of each of the aspects. For example, in Aspect A, the policy inputs provided to the controller over an API/reference Point 1.

Examples of policy inputs can include desired behavior under low load and high load. For example, the policy input could be "under low load, steer users to low-band for better coverage" and/or "under high load, maximize usage of high bands for better capacity."

Examples of policy inputs can also include desired behavior of load distribution across carriers. For example, there can be an option to "equalize load on all carriers" or "maximize usage of low-bands."

Examples of policy inputs can further include desired behavior for specific types of traffic/UEs. Examples include the following: for UEs with guaranteed bit rate (GBR) bearers, minimize call drops and handover failures; for internet of things (IoT) UEs, prefer low bands or maximize coverage; and for UEs with poor radio conditions (or cell-edge users), prefer low bands.

Examples of policy inputs can additionally include a specified measure of fairness or target objective function that the controller should achieve or maximize across the cells of interest. For example, the measure may be proportional fairness, or the target objective may be a utility function (such as a log utility function) of the user throughputs.

The controller can use these policy inputs in its determination of optimal adjustments for the inter-frequency load-balancing operations, for example, updates to parameters/weights/coefficients for calculating load metrics, weights/coefficients for measurements configurations for UEs, criteria for UE selection, or the like.

Figure 8:
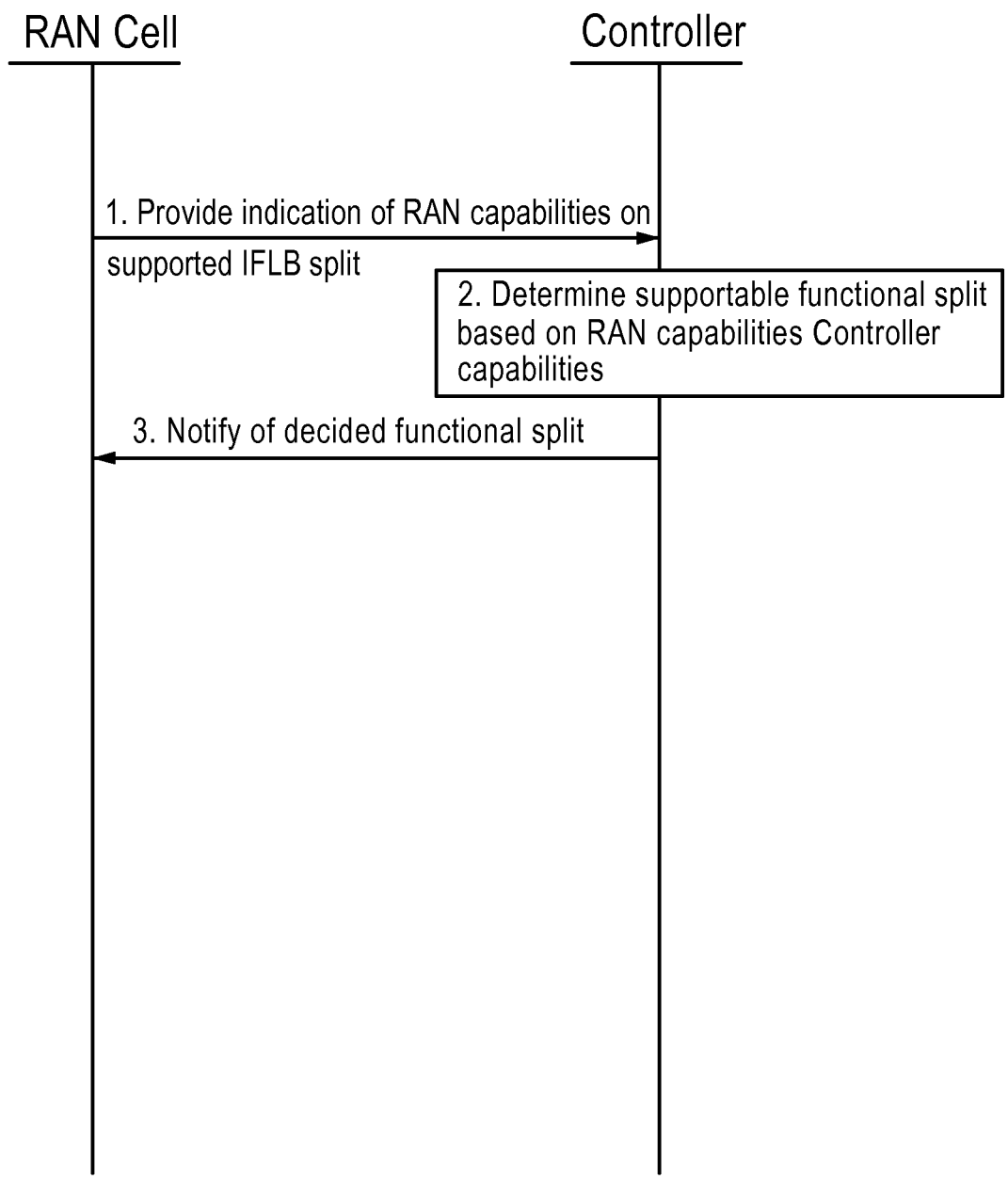
FIG. 8 illustrates negotiation of a functional split between RAN and controller, according to certain embodiments.

FIG. 8 illustrates negotiation of a functional split between RAN and controller, according to certain embodiments. As mentioned above, according to Aspect B there can be a negotiations of a functional split between RAN and controller. This negotiation may enable a controller to work with RAN IFLB implementations of different capabilities, as well as a RAN to work with Controllers of different IFLB capabilities. In an example embodiment of this negotiation, the RAN can provide to the controller a descriptor of capabilities of the RAN node to execute various parts of the IFLB operations. Additionally or alternatively, the controller may also provide to the RAN a descriptor of capabilities of the controller to execute various parts of the IFLB operations. Based on the exchanged capabilities, a suitable functional split is selected by the controller (or alternatively, by the RAN node), wherein it is determined that the RAN node will be in charge of executing a certain set of IFLB-related operations and the controller will be in charge of executing other IFLB-related operations. The controller may then provide an indication of the selected functional split (or an indication of the IFLB-related operations that the RAN will be in charge of executing) in a message to the RAN node. Alternatively, if the RAN selects the functional split, the RAN can provide an indication of the selected IFLB functional split to the controller.

Aspect C can include information being provided by the RAN to the controller. This information can include periodic information and event driven information during IFLB. Event-driven information is information that the RAN can provide to the controller when certain IFLB-related events take place in the RAN, such as when the RAN performs an IFLB operation—for example initiating load balancing when certain trigger conditions are reached, or selecting candidate UEs or target cells for IFLB handover, etc. Periodic information is information that the RAN can provide on an ongoing basis to the controller, regardless of whether any IFLB-related event has occurred.

The periodic information from the cell can include load information, such as the load metric of a cell, or components of load relating to different types of resources within a cell, or the load caused by certain types of traffic. For example, the information can include the guaranteed-bit-rate load (GBR load), the non-guaranteed-bit-rate load (non-GBR load), and physical downlink control channel (PDCCH) load of a serving cell, or a composite metric like Composite Available Capacity (CAC) that represents a combination of various such load factors. This may be calculated by the RAN node and may be further also exchanged with participating neighbor cells. The load information can also include GBR, non-GBR and PDCCH load of participating neighbor cells received as a part of IFLB load exchange.

The periodic information can also include per UE or per-bearer statistics. These statistics can include, for some or all of the non-GBR bearers in the cell, their quality-ofservice (QoS) weight which is part of bearer parameters and an average or fraction of radio resources allocated to a user by the RAN are reported to controller. This reporting can be per non-GBR bearer or can be represented as a list of non-GBR weights, number of bearers using that weight and aggregate radio resources used by non-GBR flows with that particular weight.

The periodic information can also include downlink (DL) and uplink (UL) throughput of the UEs in the cell. This can be per UE DL and UL throughput or geometric mean of DL and UL throughput of UE across the cell.

The periodic information can further include DL and UL throughput of the cell, or the geometric mean of DL and UL user throughputs.

The periodic information can additionally include an indication of current number of radio resource control (RRC) connected UEs in the cell. This can either be the current actual number, or a change/delta relative to the previous reported value.

The periodic information can also include GBR per bearer or per UE stats. For example, this can be information for all the GBR bearers in the serving cell and UE details/ID bearers that belongs to the UE.

The event driven information can be information related to UE events or cell events or IFLB events which may be either UE events or cell events. The UE event driven information during IFLB can include channel quality attributes or RF fingerprint information about the UE when it enters connected state. For example, the information can include CQI, most recent RSRP/RSRQ, path loss measured by RAN node, power headroom from PHR report, or the like.

The event driven information can include information on IFLB-related operations performed by the RAN. In an embodiment, when the RAN detects that an IFLB initiation (or exit) condition is reached, it may provide information to the controller to notify it of this condition, and provide related information at the time of this condition such as the load metrics, different load factors related to the calculation of the load metric, and the like. When the RAN selects one or more candidate UEs for IFLB handover, or obtains measurements from such UEs, it may provide that information to the controller. When the RAN selects a target cell for offloading certain UEs, it may provide a notification of that to the controller. The event driven information can also include handover status notification, and notifications of failures and partial HO failures during IFLB. When the UE tries to hand over to a selected target cell, if HO failure happens, this failure can be reported to the controller along with target cell information and the target cell RSRP and RSRQ values calculated by the UE in A4 measurements together with the reason for HO failure.

The information can also include measurement reporting, such as RSRP and RSRQ of participating neighbor cells reported to a serving cell as a part of A4 by UEs. As a part of A4 measurements, the UE can report the neighbor cells and their RSRP and RSRQ values. These values can be reported to the controller. These values may correlate hot spots. UEs can be classified based on A4 measurements.

Aspect D in Splits 2 and 3 may involve calculation of load metrics. Load metric calculation may be done by the RAN (for example, in Split 1) or by a controller (for example, in Split 2 or Split 3). Load metrics may be generically represented as weighted combination of various underlying load-related attributes of the cell, for example physical downlink shared channel (PDSCH)/physical downlink control channel (PDCCH) utilization (percentage of physical resource blocks (PRBs) or percentage of control channel elements (CCEs), physical uplink shared channel (PUSCH)/physical uplink control channel (PUCCH) utilization, number of connected UEs, or number of UEs with data in the buffer.

Load metrics may take into account various traffic types (for example, Non-GBR PRB usage, GBR PRB usage, IOT PRB usage, or the like). Load metric may take into account factors influenced by RF conditions as well (for example, number of PRBs spent in retransmissions, number of cell-edge UEs, fraction of UEs with CQI less than a given value, or the like). The different coefficients/weights to assign to the underlying factors can be determined by the controller, taking into account the policy inputs.

In Split 1, the load metric can be calculated by the RAN. Thus, the controller can determine and provide to the RAN optimal adjustments for the relevant weights/coefficients of different components of the load metric calculation as described above. In Split 2 and Split 3, the load metric can be calculated at the controller. In this case, the controller does not need to give the RAN the exact manner or weights/coefficients used to calculate the load metric. The RAN may need to gather and send all the underlying measurements to the controller.

Aspect E can include control commands provided by controller to the RAN. Part 1 (part numbers are for reference only) of the commands can include commands influencing the level of intensity and the direction, namely of the source and target carriers, of IFLB.

In one embodiment, the controller can provide an indication of a "direction" in which offload should happen: (for example "from cell or carrier X", and/or "to cell or carrier Y") and/or an "intensity indication" to indicate the magnitude of the desired offload (for example "more aggressive"/"greater offload", or "less aggressive"/"lesser offload"). This may be used, for example, to adjust the likelihood with which a particular cell gets selected as a target cell to offload UEs, or to adjust the amount of offload to be performed from a given cell, or a combination thereof. The intensity level can be represented, for example, as a number between 0 and N, where 0=no offload and N =most aggressive offload in the specified direction (for example, from or to the specified "from" and "to" cells or carriers respectively), or as a "change indication" e.g. $\{-1,0,+1\}$ where $-1$="less aggressive" (reduced intensity of offload), $+1$="more aggressive" (offload users more aggressively).

This indication of the direction and/or intensity of desired offload can describe the intent of the controller, namely the desired effect that the controller wants the RAN to achieve, and the RAN can adjust its own internal logic for IFLB operations as needed to implement the intent described by the controller. This can be more suitable for multi-vendor specification, as the parameter sets can be vendor-specific— the controller does not need to know each vendor's RAN parameters.

In another embodiment, the controller can provide adjusted or updated values or "increase/decrease" indications for specific parameters/thresholds. Here the controller explicitly specifies values (or changes) for specific parameters, rather than just providing the intent or desired effect. This allows more granular communication of the optimal adjustments by the Controller to the RAN, but may involve the RAN and controller both supporting a more granular set of parameters in common. For example, for a given cell or carrier, the controller can increase a high threshold, such that when the load in a cell increases beyond this threshold, that triggers initiation of IFLB offload of UEs from that cell/carrier. For example, for a given carrier, the system can decrease the target threshold that indicates when a carrier (cell) should stop accepting further incoming UEs handed over from other cells.

In some embodiments, which may be applicable to Split 1, the controller can communicate commands to the RAN influencing the calculation of the load metrics by the RAN. These may be relative weighting of different types of load, load filtering coefficients, and the like. For example, the commands can include increase the weight of GBR load in the load metric calculation, decrease the weight of PDCCH utilization in the load metric calculation, or the like. The controller may also communicate biasing factors or offsets to the RAN, to be used by the RAN to bias (i.e. artificially increase or decrease) the load metric of a cell or carrier (or a component of the load metric such as the GBR load or the non-GBR load or the PDCCH load). This may have the effect of increasing or decreasing the likelihood that IFLB is initiated for a cell, or increasing or decreasing the likelihood that a cell stops accepting further load offloaded from other cells, depending on the bias factors or offsets.

Part 3 of the commands, which may be applicable to Split 1 and 2, may be commands influencing the selection of candidate UEs or target cells for candidate UEs for IFLB offload, in addition to or instead of the indications of intensity direction. These commands can help to selectively apply the indicated change in the intensity/direction of the IFLB process to selected subsets of UEs. This may be based on various criteria, for example, based on the type of traffic that the UE is conducting, such as select GBR UEs only, or prefer voice over LTE (VoLTE) UEs, or prefer UEs having a flow with a given QCI range, or the like.

The criterion may be, for example, based on the nature of the UEs' channel conditions or mobility. This can be described as an intent description, for example, (i) "prefer high-mobility uEs", or "prefer low-mobility Ues", (ii) "prefer cell-edge Ues", or "prefer cell-center Ues", or the like. "High-mobility" may be described as e.g. "number of handovers during current session>K" or "CQI coherence time>T." Cell edge or cell-center classification may be described as "average CQI<K" or "last known RSRP<K" or "last known RSRQ<K." The criterion for selecting a target cell for a given UE may be a minimum signal level in the target cell, such as RSRP or RSRQ, that is, for a given UE, only cells in which the UE has a signal level greater than this minimum level may be selected as target cells for IFLB offload of that UE. The criterion for selecting a candidate UE may be a maximum (or minimum) signal level in its current cell. For example, a given UE may be selected as a candidate UE for IFLB offload from its current cell only if its signal level (or other measure of channel conditions) in its current cell is below a maximum (or above a minimum) signal level.

For any of the above commands, "include" or "exclude" qualifiers can be used together with the specified conditions for selecting the subset of UEs. The adjustment being conveyed by the controller to the RAN may be expressed as an increase or decrease qualifier, such as increasing or decreasing the minimum RSRP signal strength threshold needed to select a target cell for a candidate UE.

Part 4 of the commands, which may be applicable to Split 1, 2, and 3, may be commands influencing the measurements to obtain from the users in order to select users for offload. For example, the commands may provide that the UE be notified to perform a certain type of measurement (e.g. RSRP or RSRQ), or that the UE be notified to report the measurement when a certain type of measurement event occurs (e.g. A4 or A2) along with various thresholds or offsets or hysteresis levels as appropriate to the different events, or the like. Based on Aspect 3, the RAN will sub-select certain UEs to configure new measurement events as per Aspect 4, and then can select based on measurement reports, trigger handoffs. For example, the configured events may have event types and thresholds, RSRP filter coefficients, and the like. Further options include intent-based specification or explicit values of parameters.

Along with any of the above commands, the controller may include an indication of one or more classes or groups of UEs to which the command should be applied. This allows the controller to indicate to the RAN that the commanded actions should be applied to a subset of UEs corresponding to the indicated classes or groups, rather than to the entire cell or to all UEs in the cell.

Figure 9:
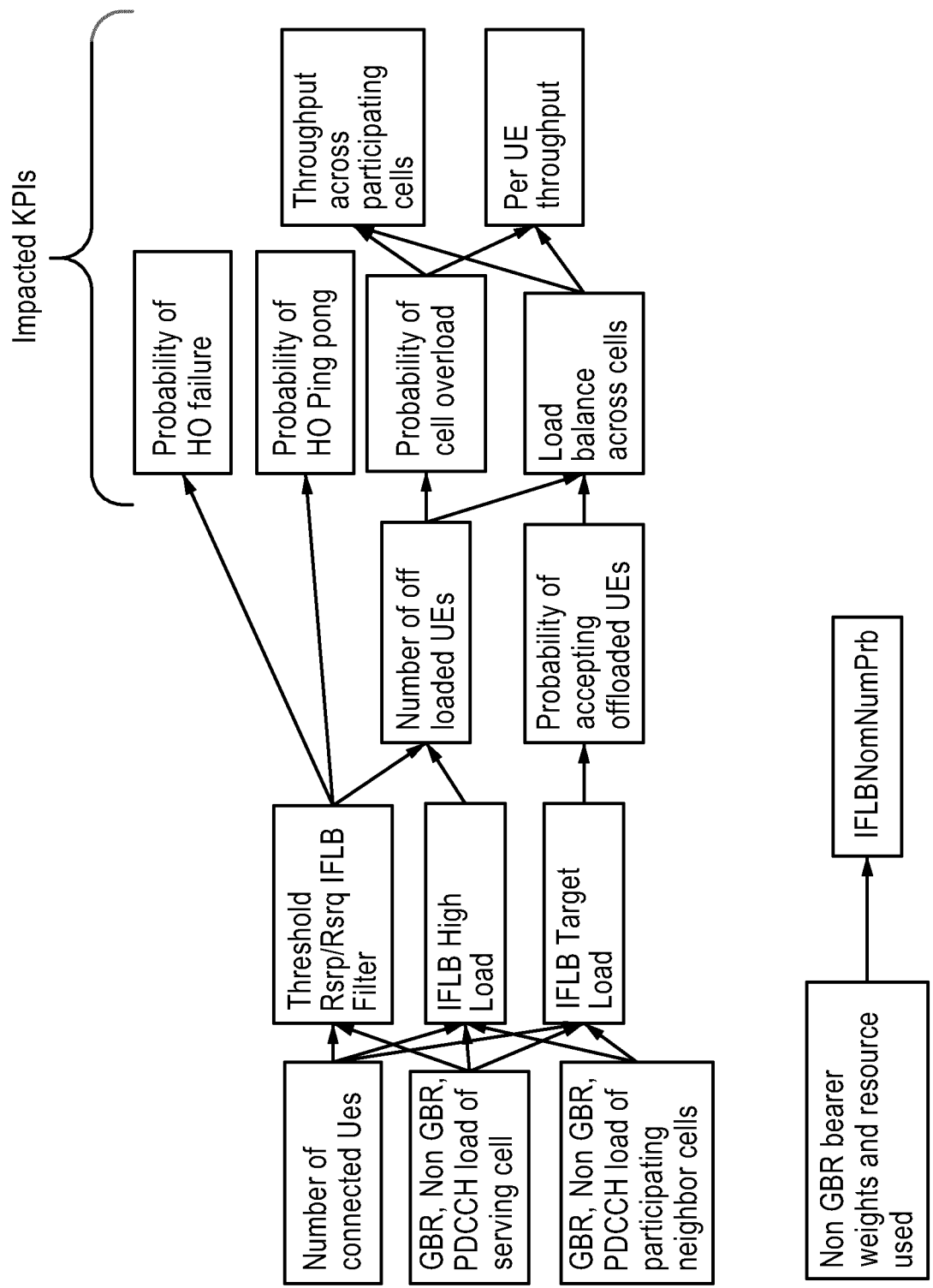
FIG. 9 illustrates impact of offloading on key performance indicators (KPI) according to certain embodiments.

FIG. 9 illustrates impact of offloading on key performance indicators (KPI) according to certain embodiments. As mentioned above, Aspect D may include determining optimal settings for IFLB. The following are examples of potential methods based on machine learning to determine optimal settings for IFLB. IFLB settings can be adjusted to vary the intensity of UE offload and direction of the offload.

Higher value of RSRP filter threshold and RSRQ filter threshold results in low chance for UEs to get offloaded, as a suitable target cell needs to be measured with higher RSRP than configured thresholds. As a result, fewer UEs may be offloaded, with less risk of HO failures and HO ping pongs. UEs that are more towards the cell edge are offloaded.

High value of target loads (GBR, non GBR and PDCCH) may allow more UEs to be accepted by the cell from neighbor cells. High value of high load (GBR, non GBR and PDCCH) may result in more traffic handled by a cell before triggering LB, which may translate to delays in offloading of UEs to neighbor cells. The edge UEs might have been better candidate for offloading.

Figure 10:
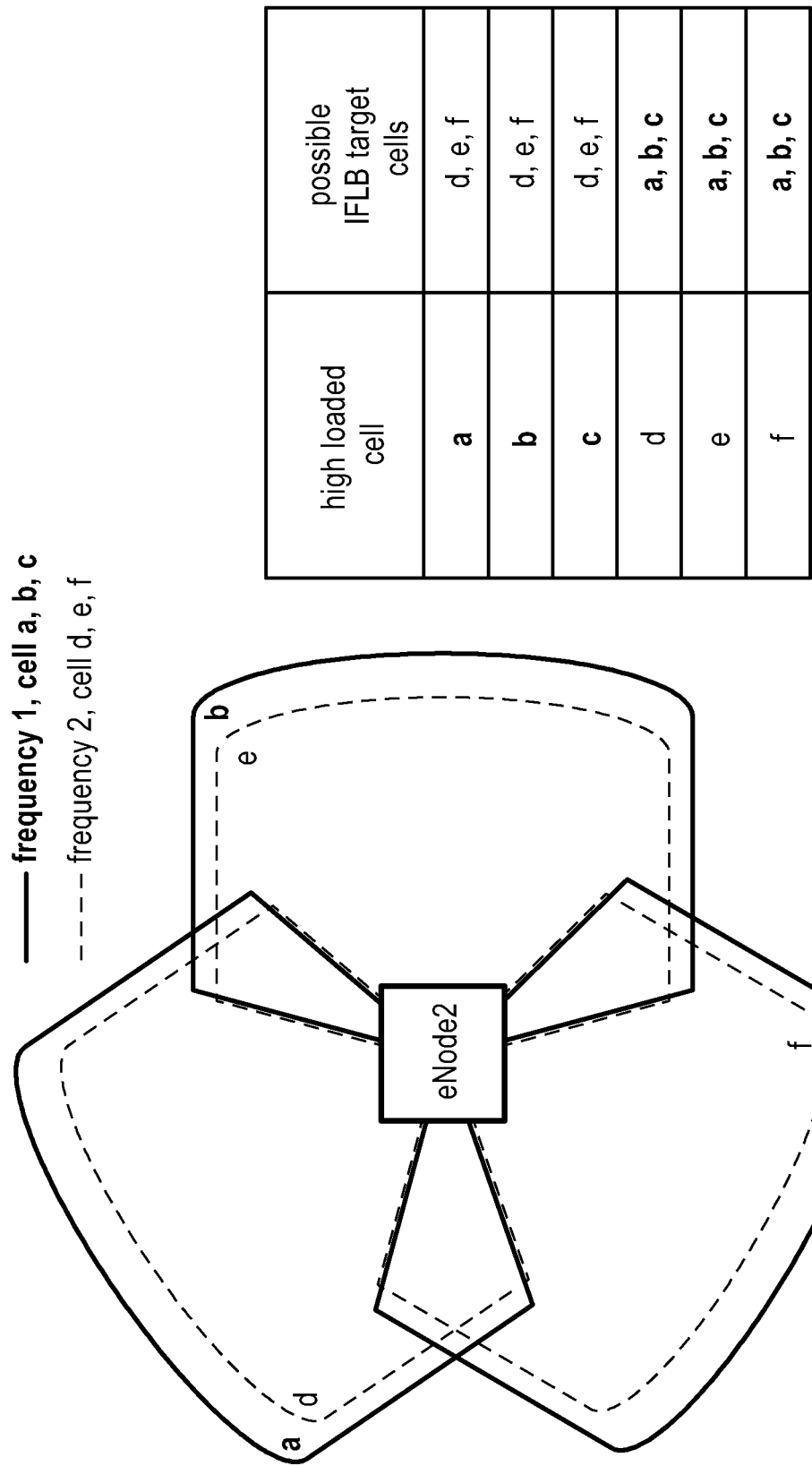
FIG. 10 illustrates load-balancing handover alternatives, according to certain embodiments.

FIG. 10 illustrates load-balancing handover alternatives, according to certain embodiments. For example, as shown in FIG. 10, a highly loaded cell may be configured to hand over to a cell of a different frequency.

If a serving cell estimated load is high, which may cause cell overload, then the system can lower "high load threshold," which can aggressively offload the UEs. The system can lower "high load threshold" but selectively offload UEs, using larger RSRP and RSRQ filter thresholds. UE channel condition under serving cell may be considered, and the system may only offload UEs that are relatively more towards the edge, using larger RSRP and RSRQ filter thresholds. This approach may improve per UE throughput, cell throughput and throughput across cells.

If serving cell estimated load is low then a higher target load threshold can be used to accept more UEs from neighbor cells. The source cell can selectively offload UEs that have better channel conditions in the target cell Based on estimated neighbor cells load and service cell load, high load and target load thresholds can be adjusted such that variance of loads across cells is kept minimal. To avoid overload in participating neighbor cells, a serving cell may need to accept some load from neighbors, even it is expected to get overloaded.

Figure 11:
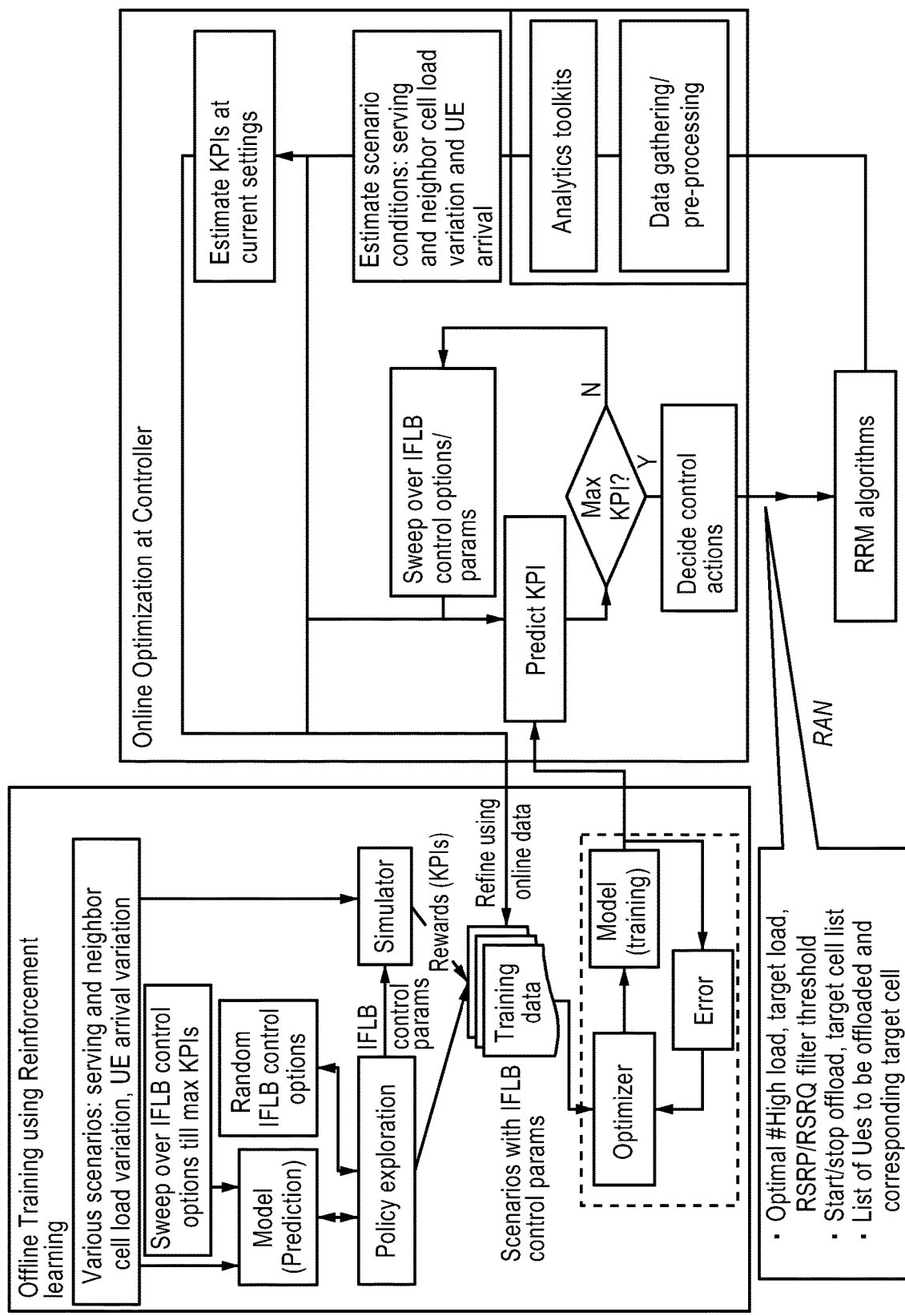
FIG. 11 illustrates offline training and online optimization, according to certain embodiments.

The system can try to maximize the RSRP and RSRQ filter thresholds but still be able to offload extra load to the neighbors. Offloaded UEs may have better channel conditions. This load balancing may improve per UE throughput, cell throughput, and throughput across cells FIG. 11 illustrates offline training and online optimization, according to certain embodiments. As shown in FIG. 11, the method used by the controller can include an online component and an offline component. The offline component can be based off simulations, or offline analysis of real data received from the RAN. The simulations can show what will be the effect on KPIs (GBR, non GBR, PDCCH load and HO failures, load balance across cells), by varying the IFLB control parameters, influencing the cell and UE section for offloading. Scenario exploration, searching optimal IFLB control parameters can be done using policy exploration. Explored control parameters can be used for generating KPIs using a simulator. Generated data (such as scenarios with IFLB control parameters and KPIs, can be used to build a model to predict the KPIs for given scenarios (load and connected user estimation) and control parameters.

The online component (executed at the controller) can perform the following: from the data received by the controller from the RAN, predict the expected service and neighbor cell load (for example, using time series); and use the offline-trained model to predict, for a range of possible IFLB settings, what the KPIs would be, and pick the optimal setting.

Based on the decision by the online component, the controller can communicate back to the RAN, based on the functional split. The communicated data can include optimal high load, target load, and RSRP/RSRQ filter threshold. The controller can send a command to start/stop offload optionally with a target cell list. The controller can even send a list of UEs to be offloaded and corresponding target cell(s).

Figure 12:
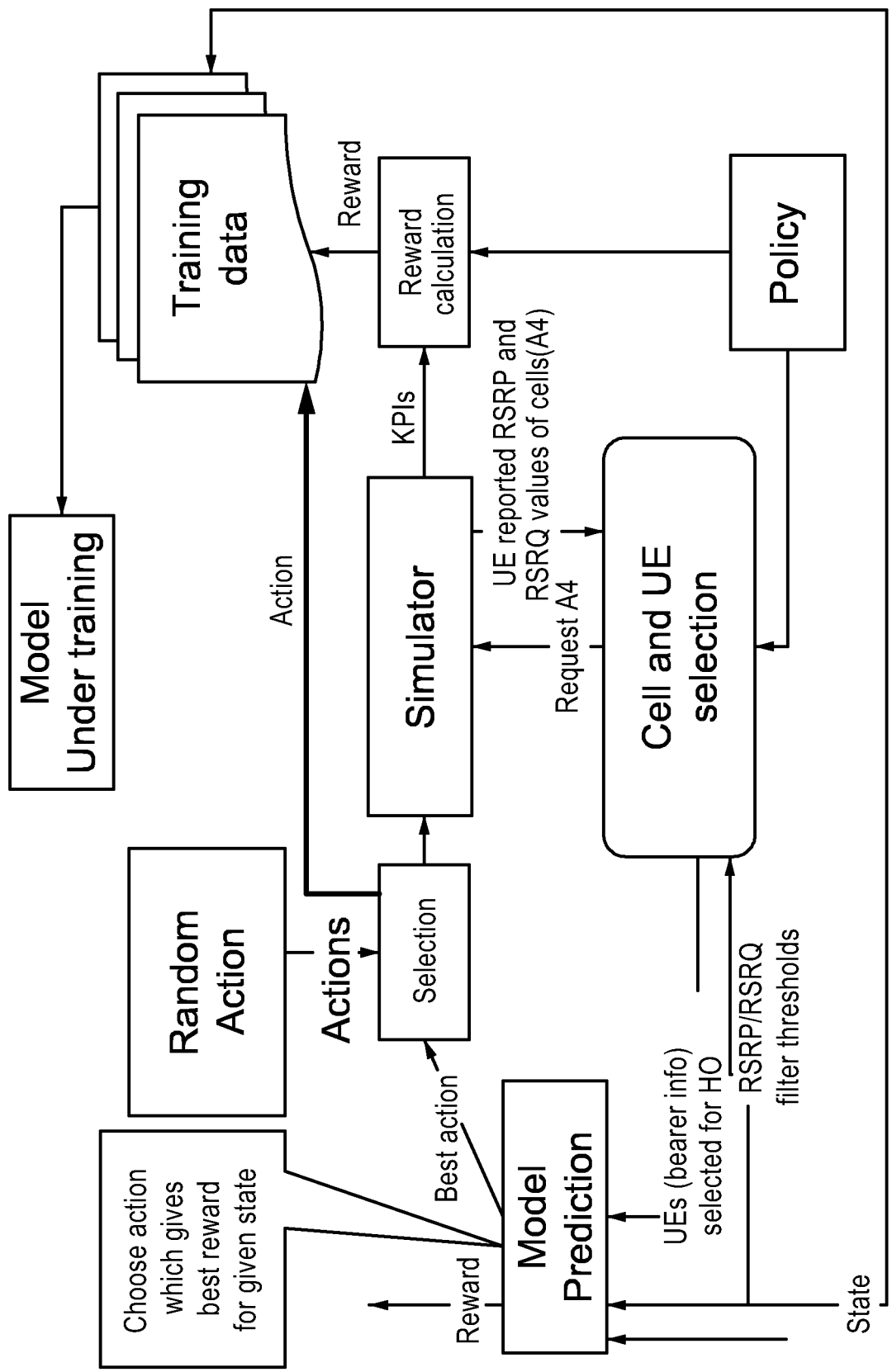
FIG. 12 illustrates offline reinforcement learning, according to certain embodiments.

FIG. 12 illustrates offline reinforcement learning, according to certain embodiments. As shown in FIG. 12, deep Q-network (DQN) reinforcement learning can be used for offline training. A greedy policy can be used for policy exploration. This module can choose the next set of actions to modify the state of the simulator. The module can choose the next action with probability E between the actions 1) generated randomly and 2) predicted by the model. In the initial stage of learning, random actions can be chosen with probability (E=1). This probability can be decreased gradually as learning progresses to 0.1.

Two versions of the model can be maintained. One model can be used for training and after certain iterations of training. A trained model can be copied to the secondary model for reward prediction. Based on the predicted reward, optimal action can be determined. Policy exploration actions can decrease or increase any of the following: RSRP filter threshold and RSRQ filter threshold; target load threshold (GBR, non-GBR and PDCCH); or high load threshold (GBR, non GBR and PDCCH).

The state of the RAN can be defined by a number of UEs selected for IFLB HO along with bearer requirements. The state can also be defined by current and estimated service cell load (GBR, non-GBR and PDCCH). The state can further be defined by a list of current and estimated neighbor cell load (GBR, non-GBR and PDCCH). The state definition can also include non-gbr estimated and current bearer count, as well as the gbr estimated and current bearer count. The state definition can further include current values of high load threshold, target load threshold, and RSRP and RSRQ filter thresholds.

Figure 13:
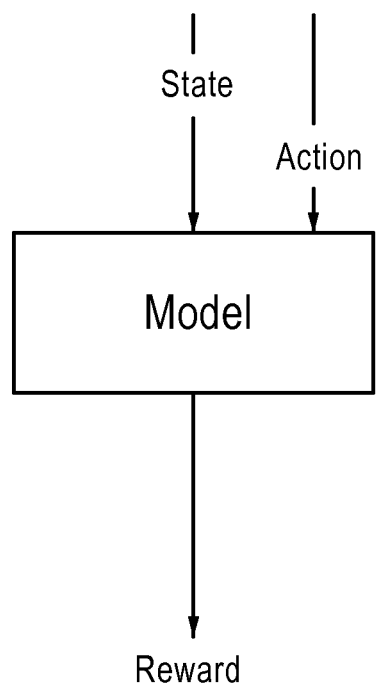
FIG. 13 illustrates the use of reward in the model according to certain embodiments.

FIG. 13 illustrates the use of reward in the model according to certain embodiments. In short, the model may receive state and action as inputs and may yield a reward as an output.

A selection block can select the action to choose towards the RAN between action from model and action from policy exploration, with a probability. If the model predicted action needs to be considered, then the action which results in the best reward can be chosen as next action. When sweeping over all possible actions, for every action "Cell and UE selection" block can be looked up using RSRP/RSRQ filter thresholds (this information can be part of the action) for available UEs for IFLB HO along with their bearer info. Available UEs for IFLB HO along with their bearer information can form the state.

Based on the action chosen, the RAN IFLB settings configuration can be updated with adjusted settings. With the new settings, KPIs can be collected, and based on KPIs a reward can be calculated. The reward can be a weighted sum of predicted KPIs for, for example, per UE, UL/DL throughput, UL DL cell throughput, aggregated throughput of participated cells, HO failures, and load variance across cells.

Data including state, action and reward can form a training record. This training record can be appended to the existing records. Training data can be sampled randomly and the sample can be used for training the model.

Figure 14:
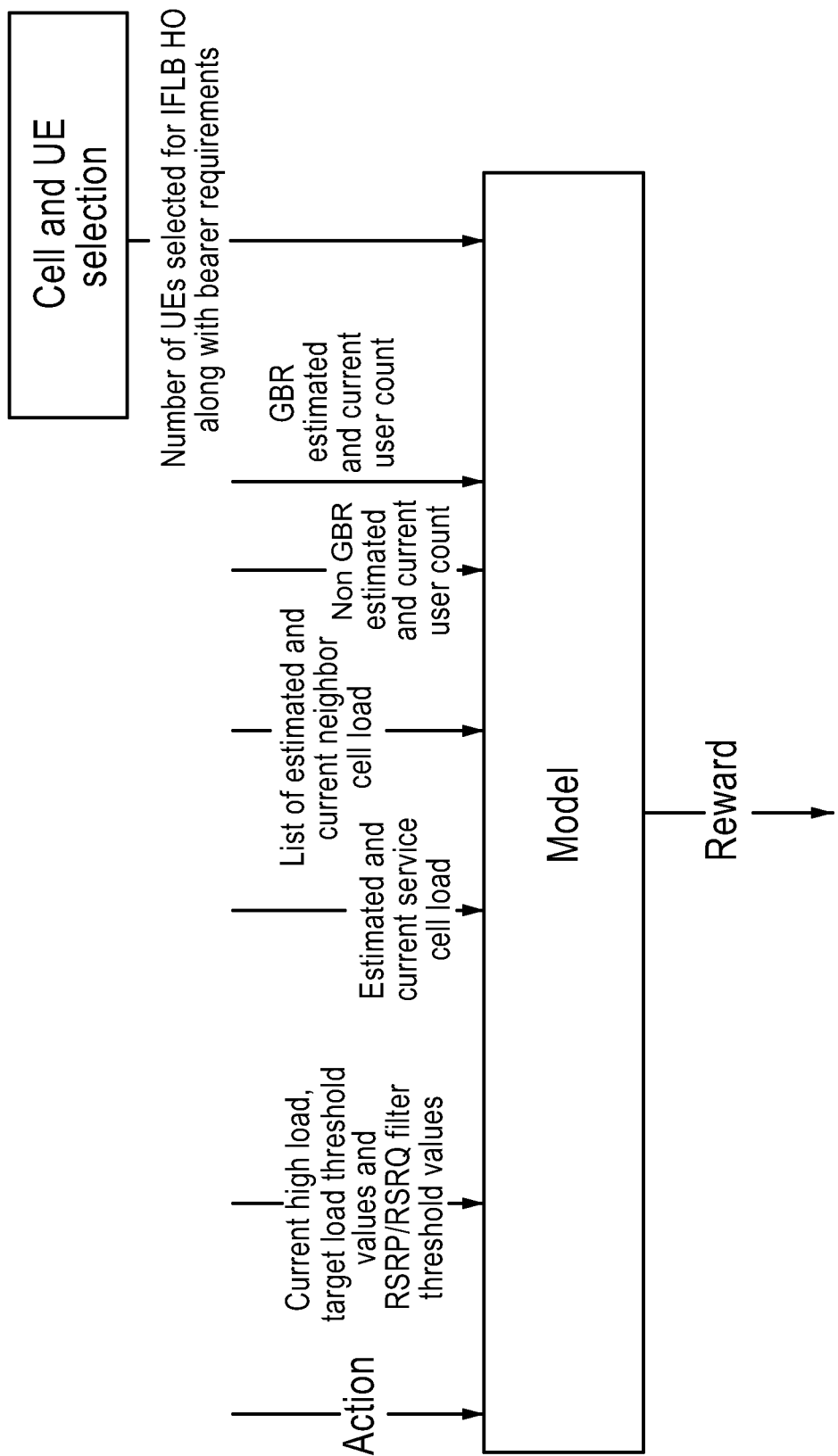
FIG. 14 illustrates a neural network implementation, according to certain embodiments.

FIG. 14 illustrates a neural network implementation, according to certain embodiments. The policy exploration actions can be to decrease or increase any of the following: RSRP filter threshold and RSRQ filter threshold; target load threshold (GBR, non-GBR and PDCCH); and high load threshold (GBR, non GBR and PDCCH).

Figure 15:
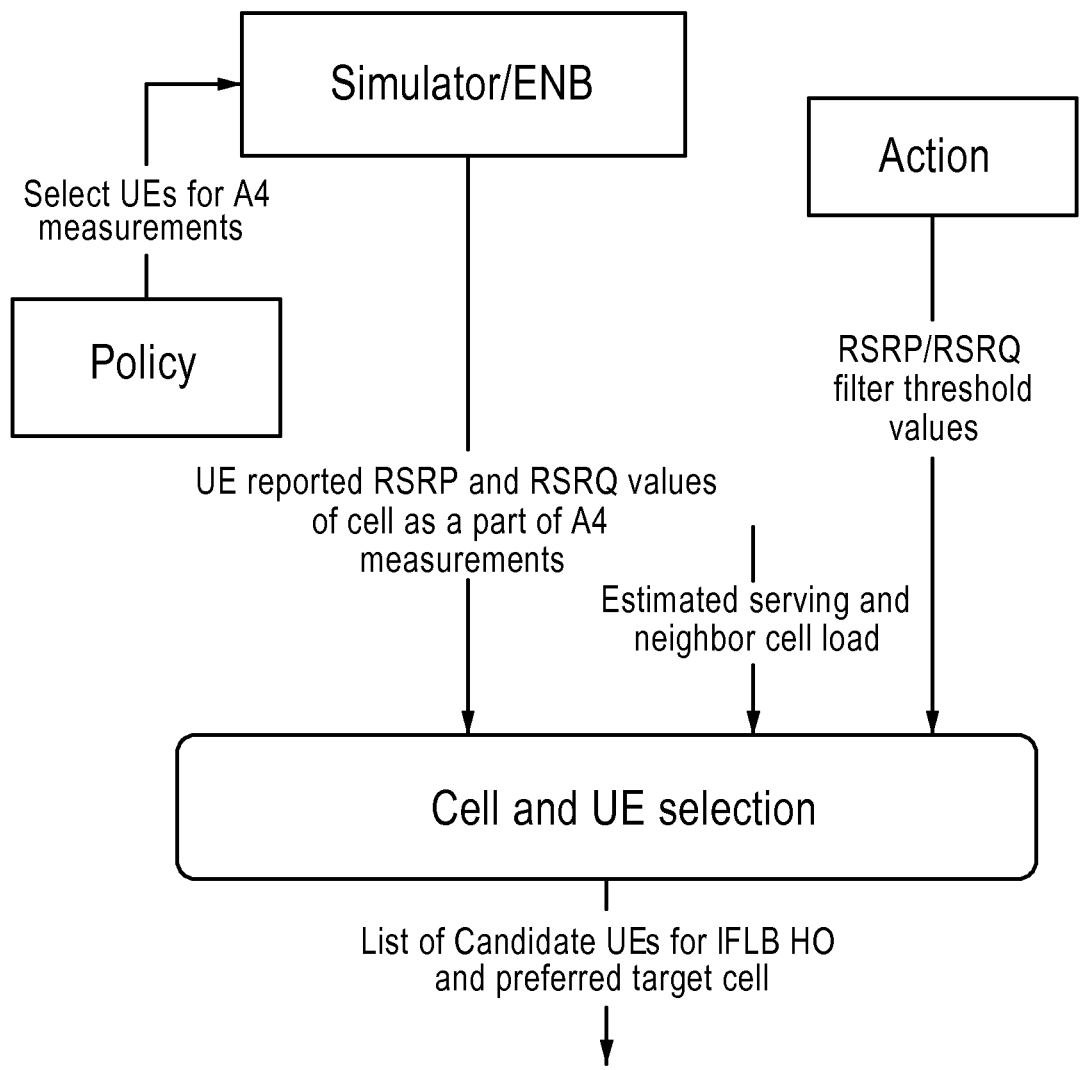
FIG. 15 illustrates cell and UE selection, according to certain embodiments.

FIG. 15 illustrates cell and UE selection, according to certain embodiments. If the UE reported RSRP and RRQ values as a part of A4 reports, estimated loads (GBR, non GBR and PDCCH) of serving and neighboring cells are available, for given RSRP/RSRQ filter thresholds, selecting the UEs and target cells for HO can be deterministic.

Based on the specified policy "cell and UE selection block," the system can select UEs for A4 measurements and can send the request to ENB/RAN to get A4 measurement for those selected UEs.

If UE the fails to report one of the participating neighbor cells RSRP/RSRQ value, then the RSRP/RSRQ value can be considered as infinitely worst RSRP/RSRQ for that cell.

The following outline describes a method to come up with list of Ues and their preferred target cell for given information, which can include the following: RSRP/RSRQ filter threshold values, which can be part of action; estimated serving and neighbor cell load (GBR, non GBR and PDCCH); and UE reported RSRP and RSRQ values of cells as a part of A4 measurements.

In this outline, the UE can reports A4 measurement and reports RSRP/RSRQ values for all the N participating neighbor cells, treating as infinite worst RSRP/RSRQ for unreported cells. Also how much load each neighbor is able to accept can be calculated.

UEs can be classified into N (per neighbor cell) groups based on reported data. RSRP/RSRQ of neighbor cells using K-Mean clustering. RSRP/RSRQ value can be used as the distance. These clusters can be mapped to the N cells.

Next, a group can be found whose aggregated required load is more than corresponding load neighbor cell can accept from serving cell. Within that group, select subgroup of UEs with better RSRP/RSRQ values whose aggregated required load can be offloaded to corresponding neighbor cell of that group. For that corresponding neighbor cell, minimum RSRP value can be recorded. The selected UE and corresponding neighbor cell can be removed from classification and recorded and N becomes N−1. The process can cycle back and continue until N=0

Figure 16:
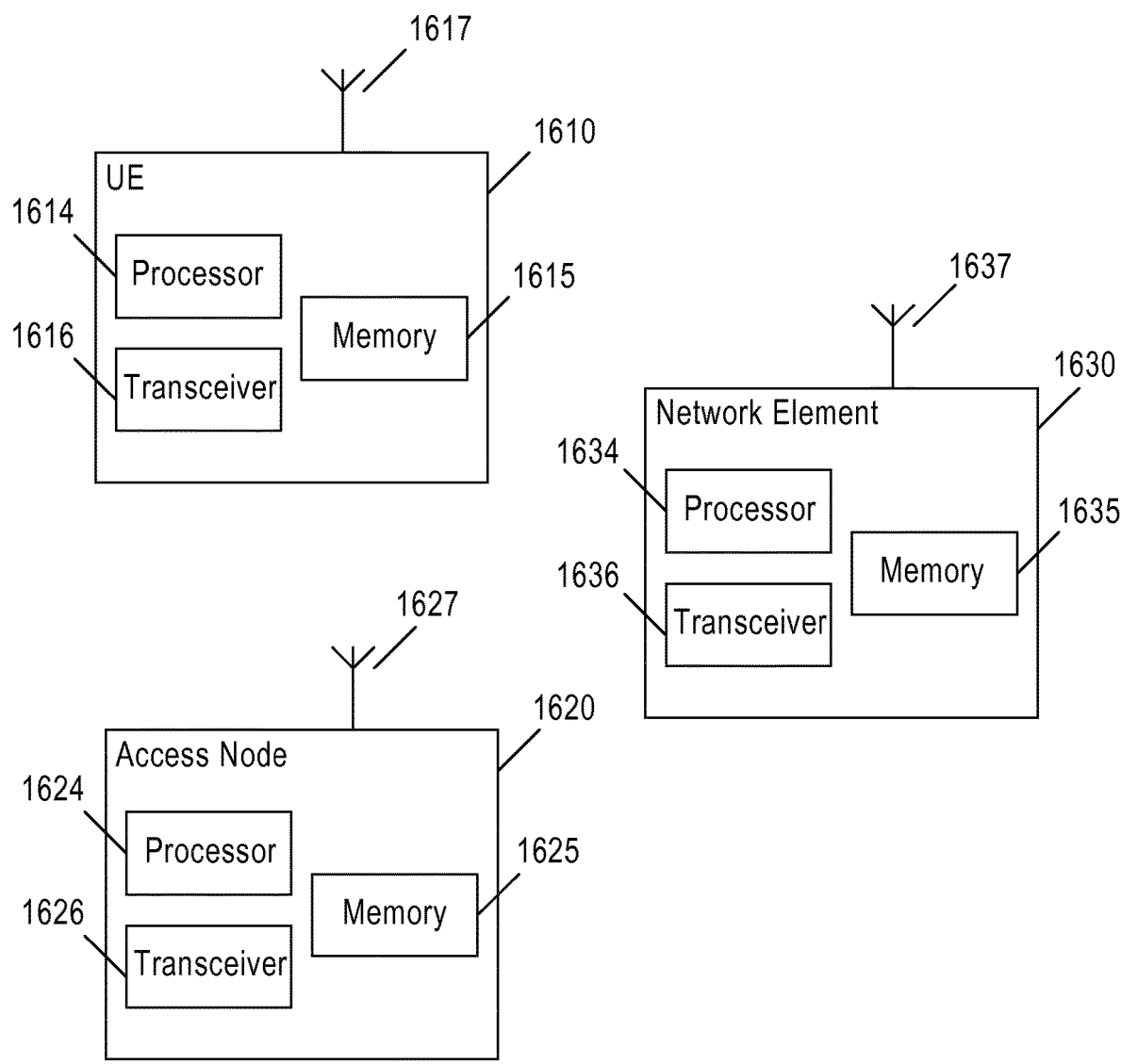
FIG. 16 illustrates a system according to certain embodiments.

When N becomes 0, there can be a list of neighbor cells with UEs that can accommodate RSRP/RSRQ values. Based on RSRP/RSRQ values (part of action) UEs in the above-mentioned list can be filtered out and the filtered list can be provided to the neural net model FIG. 16 illustrates a system according to certain embodiments of the invention. In one embodiment, a system may include multiple devices, such as, for example, at least one UE 1610, at least one access node 1620, which may be any RAN node such as an eNB, gNB, or other base station or access point, and at least one network element 1630, which may be a controller, a policy node, such as a policy/orchestration engine, or any other network element described herein.

Each of these devices may include at least one processor, respectively indicated as 1614, 1624, and 1634. At least one memory can be provided in each device, and indicated as 1615, 1625, and 1635, respectively. The memory may include computer program instructions or computer code contained therein. The processors 1614, 1624, and 1634 and memories 1615, 1625, and 1635, or a subset thereof, can be configured to provide means corresponding to the various method steps described herein.

As shown in FIG. 16, transceivers 1616, 1626, and 1636 can be provided, and each device may also include an antenna, respectively illustrated as 1617, 1627, and 1637. Other configurations of these devices, for example, may be provided. For example, network element 1630 may be configured for wired communication, in addition to wireless communication, and in such a case antenna 1637 can illustrate any form of communication hardware, without requiring a conventional antenna.

Transceivers 1616, 1626, and 1636 can each, independently, be a transmitter, a receiver, or both a transmitter and a receiver, or a unit or device that is configured both for transmission and reception.

Processors 1614, 1624, and 1634 can be embodied by any computational or data processing device, such as a central processing unit (CPU), application specific integrated circuit (ASIC), or comparable device. The processors can be implemented as a single controller, or a plurality of controllers or processors.

Memories 1615, 1625, and 1635 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as UE 1610, access node 1620, and network element 1630, to perform any of the processes described herein (see, for example, FIG. 3). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 16 illustrates a system including a UE, access node, and network element, embodiments of the invention may be applicable to other configurations, and configurations involving additional elements. For example, not shown, additional UEs may be present, and additional core network elements may be present.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method comprising:
receiving, by a controller, a set of data related to a determination of optimal settings for inter-frequency load-balancing;
determining, by the controller, at least one modification to at least one parameter of inter-frequency load-balancing operation to be performed by a radio access network node;
communicating, by the controller, the determined at least one modification; and
negotiating a functional split of inter-frequency load-balancing.

2. The method of claim 1, further comprising receiving policy inputs regarding how the inter-frequency load-balancing operation should operate.

3. The method of claim 2, wherein the policy inputs comprise at least one of:
a desired behavior under low and high load,
a desired behavior of load distribution across carriers,
a desired behavior for specific types of traffic, or
a specified objective function that the controller should achieve.

4. The method of claim 1, wherein the set of data comprises at least one of:
a load metric of at least one cell,
a per user equipment statistic,
a per bearer statistic,
a downlink and uplink throughput of the user equipment of at least one cell,
an indication of a current number of radio resource control connected user equipment in at least one cell, or
information related to a user equipment or cell event.

5. The method of claim 1, wherein the communicating by the controller comprises at least one of:
a command to influence a level of intensity and a direction,
an indication of a direction and/or a magnitude of an offload,
an increase/decrease indication for a threshold,
a command influencing calculation of load metrics,
a command influencing selection of candidate user equipment for inter-frequency load-balancing,
a command influencing selection of cells for which inter-frequency load-balancing should be invoked or triggered,
a command for influencing selection of target cells for inter-frequency load-balancing, and
an indication of at least one class of user equipment to which commands should be applied.

6. The method of claim 1, wherein the at least one modification comprises at least one of:
adjusting weights, coefficients, parameters, or factors to be used in a calculation of a load metric for at least one cell,
updating a condition for initiating or exiting inter-frequency load-balancing, updating a selection of user equipment criteria, and
updating a selection of target cells criteria.

7. The method of claim 1, wherein the at least one modification comprises at least one of:
 evaluating a load metrics for at least one cell,
 determining whether to initiate or exit inter-frequency load-balancing based on whether a condition for initiating or exiting inter-frequency load-balancing has been satisfied, and
 selecting at least one candidate target cell for handover of at least one user equipment for load-balancing purposes.

8. An apparatus, comprising:
 at least one processor; and
 at least one memory including a computer program code, wherein the at least one memory and the computer program code are configured, with the at least one processor, to cause the apparatus to:
 receive a set of data related to a determination of optimal settings for inter-frequency load-balancing;
 determine at least one modification to at least one parameter of inter-frequency load-balancing operation to be performed by a radio access network node;
 communicate the determined at least one modification; and negotiate a functional split of inter-frequency load-balancing.

9. The apparatus of claim 8, wherein the at least one memory and the computer program code are configured, with the at least one processor, to cause the apparatus to receive policy inputs regarding how the inter-frequency load-balancing operation should operate.

10. The apparatus of claim 9, wherein the policy inputs comprise at least one of:
 a desired behavior under low and high load,
 a desired behavior of load distribution across carriers,
 a desired behavior for specific types of traffic, or
 a specified objective function that the controller should achieve.

11. The apparatus of claim 8, wherein the set of data comprises at least one of:
 a load metric of at least one cell,
 a per user equipment statistic,
 a per bearer statistic,
 a downlink and uplink throughput of the user equipment of at least one cell,
 an indication of a current number of radio resource control connected user equipment in at least one cell, or
 information related to a user equipment or cell event.

12. The apparatus of claim 8, wherein the communication comprises at least one of:
 a command to influence a level of intensity and a direction,
 an indication of a direction and/or a magnitude of an offload,
 an increase/decrease indication for a threshold,
 a command influencing calculation of load metrics,
 a command influencing selection of candidate user equipment for inter-frequency load-balancing,
 a command influencing selection of cells for which inter-frequency load-balancing should be invoked or triggered,
 a command for influencing selection of target cells for inter-frequency load-balancing, and
 an indication of at least one class of user equipment to which commands should be applied.

13. The apparatus of claim 8, wherein the at least one modification comprises at least one of:
 adjusting weights, coefficients, parameters, or factors to be used in a calculation of a load metric for at least one cell,
 updating a condition for initiating or exiting inter-frequency load-balancing,
 updating a selection of user equipment criteria, and
 updating a selection of target cells criteria.

14. The apparatus of claim 8, wherein the at least one modification comprises at least one of:
 evaluating a load metrics for at least one cell,
 determining whether to initiate or exit inter-frequency load-balancing based on whether a condition for initiating or exiting inter-frequency load-balancing has been satisfied, and
 selecting at least one candidate target cell for handover of at least one user equipment for load-balancing purposes.

15. The apparatus of claim 8, wherein the at least one modification comprises at least one of:
 selecting at least one candidate user equipment for obtaining measurements, and
 selecting at least one target user equipment to handover for load-balancing purposes.

16. An apparatus, comprising:
 at least one processor; and
 at least one memory including a computer program code, wherein the at least one memory and the computer program code are configured, with the at least one processor, to cause the apparatus to:
 provide a set of data related to a determination of optimal settings for inter-frequency load-balancing; and
 receive at least one modification to at least one parameter of inter-frequency load-balancing; and
 negotiate a functional split of inter-frequency load-balancing.

17. The apparatus of claim 16, wherein the modifications are received over interface B1.

* * * * *